United States Patent
Berg et al.

(10) Patent No.: US 11,507,772 B2
(45) Date of Patent: Nov. 22, 2022

(54) SEQUENCE EXTRACTION USING SCREENSHOT IMAGES

(71) Applicant: UiPath, Inc., New York, NY (US)

(72) Inventors: Christian Berg, Seattle, WA (US); Shirin Feiz Disfani, Port Jeff Station, NY (US)

(73) Assignee: UIPATH, INC., New York, NY (US)

(*) Notice: Subject to any disclaimer, the term of this patent is extended or adjusted under 35 U.S.C. 154(b) by 374 days.

(21) Appl. No.: 16/591,161

(22) Filed: Oct. 2, 2019

(65) Prior Publication Data

US 2021/0103767 A1    Apr. 8, 2021

(51) Int. Cl.
| | |
|---|---|
| B25J 9/16 | (2006.01) |
| G06K 9/62 | (2022.01) |
| G06V 30/148 | (2022.01) |
| G06V 30/10 | (2022.01) |
| G06V 10/762 | (2022.01) |
| G06V 30/19 | (2022.01) |
| G06F 16/55 | (2019.01) |
| G06F 9/451 | (2018.01) |
| G06F 16/535 | (2019.01) |
| G06F 16/583 | (2019.01) |

(52) U.S. Cl.
CPC ............ G06K 9/6218 (2013.01); B25J 9/163 (2013.01); B25J 9/1656 (2013.01); G06V 30/153 (2022.01)

(58) Field of Classification Search
None
See application file for complete search history.

(56) References Cited

U.S. PATENT DOCUMENTS

| | | | |
|---|---|---|---|
| 10,339,027 B2 | 7/2019 | Garcia et al. | |
| 10,365,799 B2 | 7/2019 | Hosbettu et al. | |
| 10,684,943 B2* | 6/2020 | Fei | G06K 9/6278 |
| 10,981,272 B1* | 4/2021 | Nagarajan | B25J 9/1669 |
| 2006/0184410 A1 | 8/2006 | Ramamurthy et al. | |
| 2010/0106551 A1 | 4/2010 | Koskimies et al. | |
| 2010/0232719 A1* | 9/2010 | Vincent | G06V 10/98 382/225 |
| 2014/0019979 A1 | 1/2014 | Amershi et al. | |
| 2017/0001308 A1* | 1/2017 | Bataller | G05B 19/0423 |

(Continued)

FOREIGN PATENT DOCUMENTS

| | | | | |
|---|---|---|---|---|
| CN | 101707011 A | * | 5/2010 | |
| EP | 3675008 A1 | * | 7/2020 | G06F 11/3438 |

OTHER PUBLICATIONS

Discovering Process Discovery, Comparing Process Discovery with Conventional Process Mining Tools.

*Primary Examiner* — Mohammed Rachedine
(74) *Attorney, Agent, or Firm* — Volpe Koenig (57) ABSTRACT

A system and method for sequence extraction using screenshot images to generate a robotic process automation workflow is disclosed. The system and method include capturing a plurality of screenshots of steps performed by a user on an application using a processor, storing the screenshots in memory, determining action clusters from the captured screenshots by randomly clustering actions into an arbitrary predefined number of clusters, wherein screenshots of different variations of a same action is labeled in the clusters, extracting a sequence from the clusters, and discarding consequent events on the screen from the clusters, and generating an automated workflow based on the extracted sequences.

18 Claims, 7 Drawing Sheets

(56) References Cited

U.S. PATENT DOCUMENTS

| | | |
|---|---|---|
| 2018/0113781 A1 | 4/2018 | Kim et al. |
| 2018/0144254 A1 | 5/2018 | Bataller et al. |
| 2019/0129748 A1* | 5/2019 | Stevens .............. G06Q 10/0633 |
| 2020/0147791 A1* | 5/2020 | Safary ................... G06N 20/00 |
| 2020/0206920 A1* | 7/2020 | Ma ................... G06Q 10/06398 |

* cited by examiner

SEQUENCE EXTRACTION USING SCREENSHOT IMAGES

BACKGROUND

In order to identify the candidate processes and extract action sequences, existing technology utilizes generic information regarding user actions, such as user clicks or keystrokes, in conjunction with the information regarding the User Interface (UI) elements. The problem with the gathered information from UI elements is that it may vary across different platforms and may contain noise because the UI elements are dependent in the application level configurations.

As such, enterprises that are working on utilizing Robotic Process Automation (RPA) to automate their processes struggle in identifying the candidate processes that can be automated and end-up up with high professional service fees and/or low ROI.

SUMMARY

A system and method for sequence extraction using screenshot images to generate a robotic process automation workflow are disclosed. The system and method is related to automatically identifying candidate tasks for Robotic Process Automation (RPA) on desktop applications and more particularly to sequence extraction for identifying repetitive tasks from screenshots of user actions. The system and method include capturing a plurality of screenshots of steps performed by a user on an application using a processor, storing the screenshots in memory, determining action clusters from the captured screenshots by randomly clustering actions into an arbitrary predefined number of clusters, wherein screenshots of different variations of a same action is labeled in the clusters, extracting a sequence from the clusters, and discarding consequent events on the screen from the clusters, and generating an automated workflow based on the extracted sequences.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

For the methods and processes described below the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

The system and method is related to automatically identifying candidate tasks for Robotic Process Automation (RPA) on desktop applications and more particularly to sequence extraction for identifying repetitive tasks from screenshots of user actions. A system and method for sequence extraction using screenshot images to generate a robotic process automation workflow are disclosed. The system and method include capturing a plurality of screenshots of steps performed by a user on an application using a processor, storing the screenshots in memory, determining action clusters from the captured screenshots by randomly clustering actions into an arbitrary predefined number of clusters, wherein screenshots of different variations of a same action is labeled in the clusters, extracting a sequence from the clusters, and discarding consequent events on the screen from the clusters, and generating an automated workflow based on the extracted sequences.

Figure 1A:
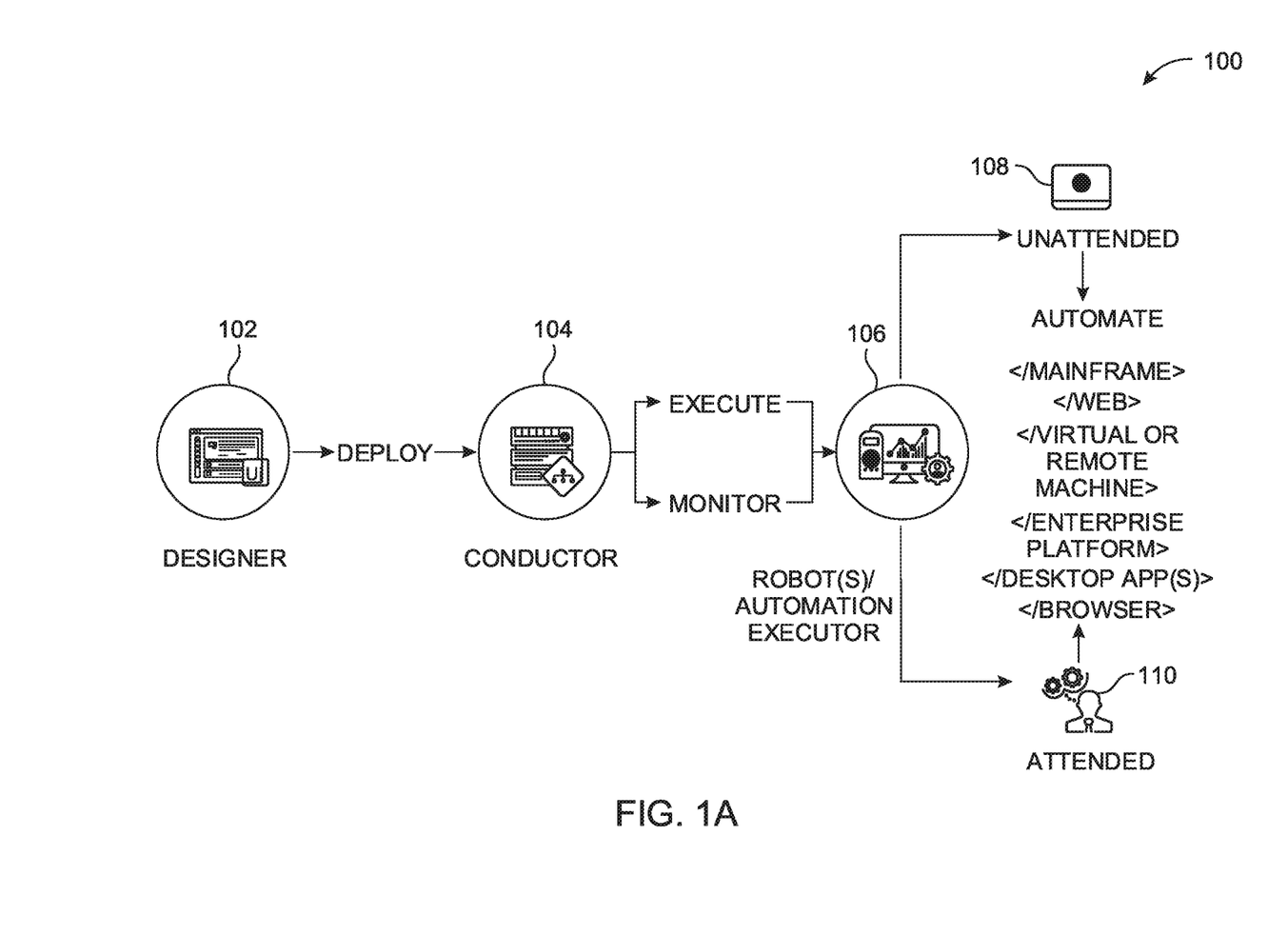
FIG. 1A is an illustration of robotic process automation (RPA) development, design, operation, or execution.

FIG. 1A is an illustration of RPA development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language ((HTML), HTML5, extensible markup language (XML), Javascript, C#, C++, Silverlight, or the like.

A workflow may include, but is not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without the aid of third party inputs or control. For attended 110 operation, automation may be performed by receiving input, commands, instructions, guidance, or the like from a third party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
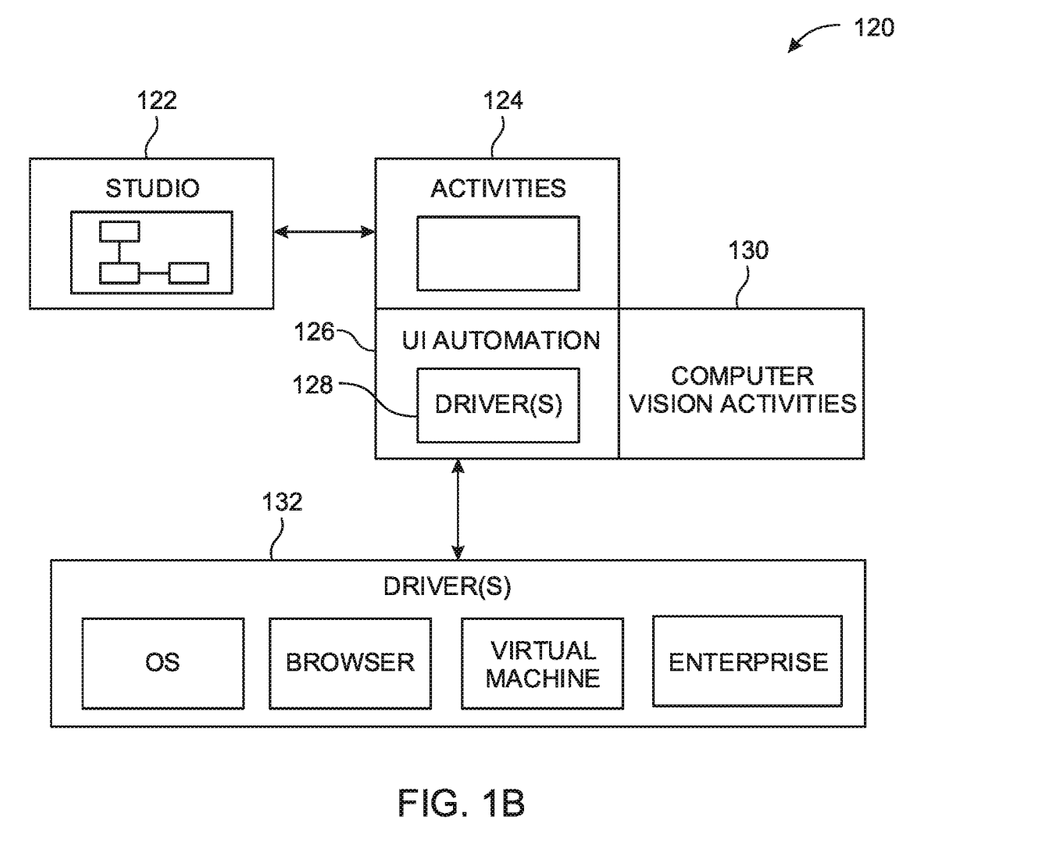
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
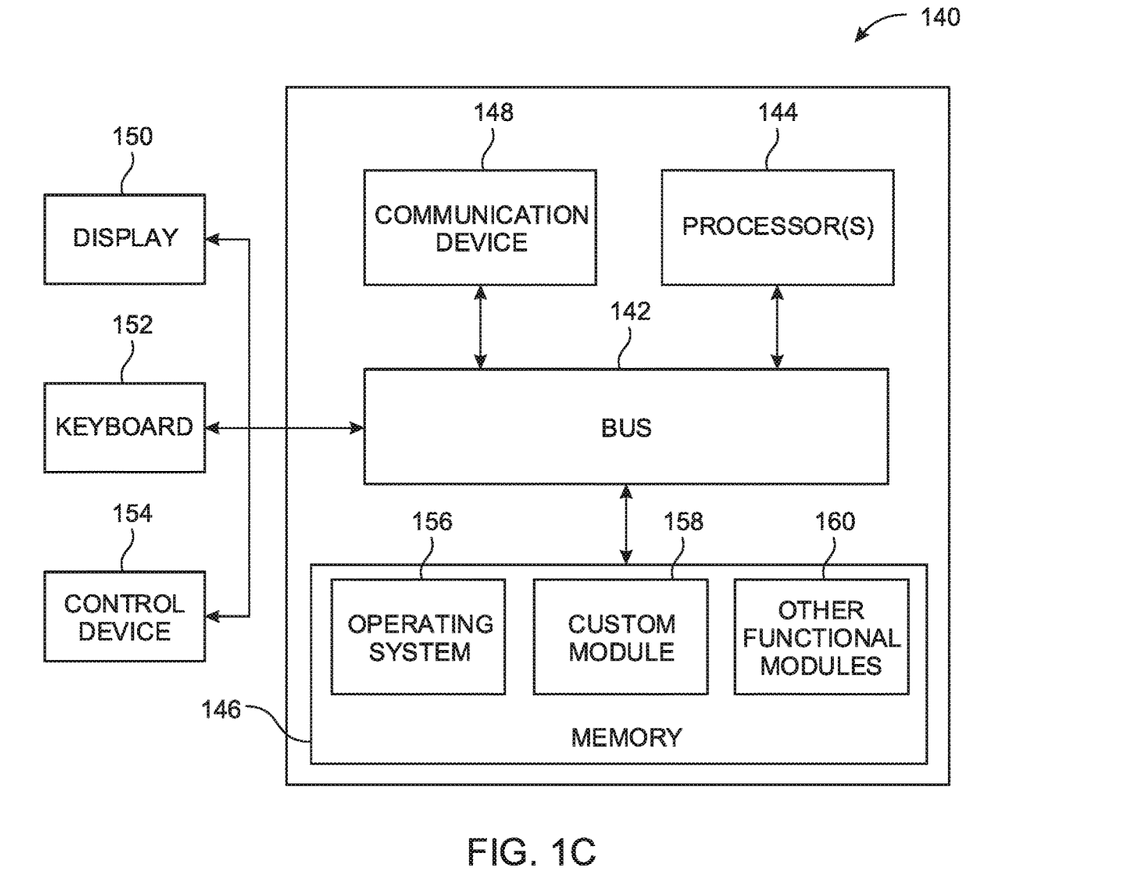
FIG. 1C is an illustration of a computing system or environment.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

In the included embodiments, screenshots of user actions are used to extract sequences of repeated actions. The sequence extraction may occur using action clustering. Action clustering is configured to label screenshots pertaining to different variations of the same action. A screenshot-based approach for unsupervised clustering of the actions may be used.

The disclosed embodiments relate to automatically identifying candidate tasks for RPA on desktop applications. The candidate tasks may be identified using sequence extraction applied to screenshots of user actions to extract sequences of repeated actions. Sequence extraction may include the steps of randomly clustering the actions into a predefined number of clusters, defining templates for each cluster, aggregating the features used in the templates as a sparse feature space where samples are clustered again, and introducing the sequence extraction method after unification of samples into cluster labels. The template may be defined as the layout of a screen that is unique to that screen although understanding that similar screens follow the layout.

Figure 2:
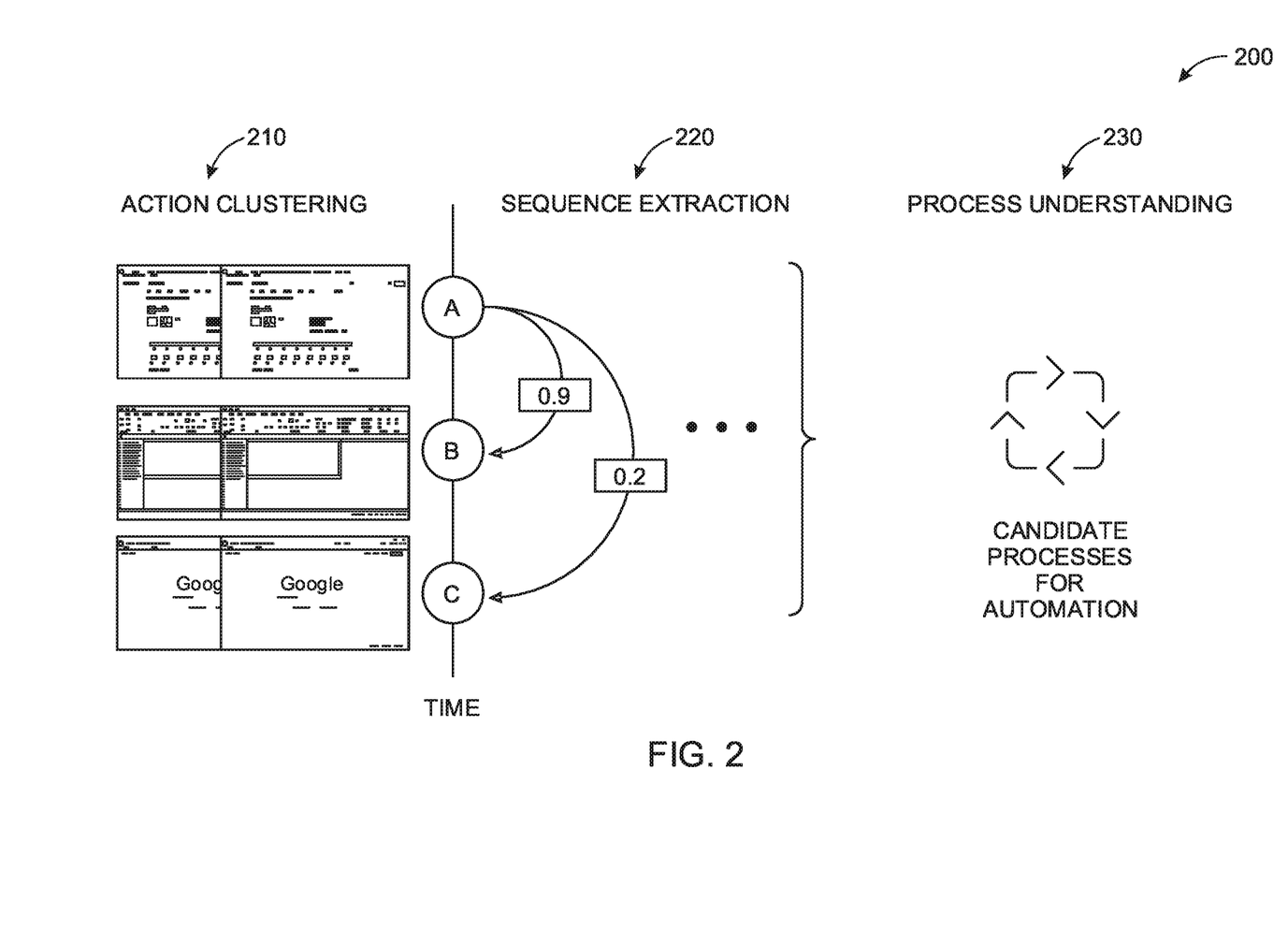
FIG. 2 illustrates a depiction of the candidate identification.

FIG. 2 illustrates a depiction of the candidate identification 200. Candidate identification 200 identifying the candidate processes that can be automated and end-up up with high professional service fees and/or low ROI. Candidate identification 200 includes clustering actions 210, such as user actions and UI elements, extracting sequences 220 from the clustered actions 210, and understanding the processes 230 based on the extracted sequences 220 in order to identify candidate processes for automation while minimizing professional fees and improving ROI. Candidate identification 200 includes action clustering or clustering actions 210 where multiple screen shots are clustered for defining a common template. Clustering actions 210 may include templates, adaptive parameter tuning, random sampling, clustering details and novelty as will be described in more detail below. Candidate identification 200 includes sequence extraction or extracting sequences 220 that identifies the sequence of execution of tasks from the clusters. Extracting sequence 220 may include forward link estimation, graph representation and action clustering as will be described in more detail below. Candidate identification 200 includes understanding processes 230 such as candidate process identification for RPA.

Clustering actions 210 leverages the optical character recognition (OCR) data extracted from the screenshots. In an exemplary implementation, an OCR engine is used to extract word and location pairs of data from the screenshots. Using the set of words and the corresponding (normalized) coordinates on the screenshots, an adaptive particle-based approach is implemented that iteratively extracts sparse feature sets for the clustering. The clustering actions 210 may be randomly clustered into an arbitrary predefined number of clusters (number of clusters>0).

Clustering actions 210 iteratively utilizes a center-based clustering paradigm. For every cluster, a center is defined. In this context, a center is referred to as template. Templates are defined as the layout of a screen that is unique to that screen although understanding that similar screens follow that layout. Using this assumption, the clustering actions 210 determines the templates for each cluster. The aggregation of features used in the templates is then used as a sparse feature space where samples are clustered again as shown in Equation 1, given a set of N screenshots S:

$$S=\{s_1, s_2, \ldots, s_N\}. \quad \text{Equation 1}$$

In each screenshot $s_i$ the OCR engine finds $m_i$ words with the corresponding location on the image. For simplicity, every location is normalized according to screen resolution and turned into the (area, center$_x$, center$_y$) format. In Equation 2, the $j_{th}$ word seen in screenshot $s_i$, is shown as $w_{ij}$ with its corresponding location being $l_{ij}$.

$$OCR(Si)=\{(w_{ij}, l_{ij}) \text{ for } j \in (0, m_i)\} \quad \text{Equation 2}$$

Assuming a clustering π: S→C, where C={$c_1, c_2, \ldots, c_K$} is the set of K cluster labels, the screenshot $s_i$ is in the cluster $c_k$ if π($s_i$)=ck. A template may be created based on frequent words and locations in a cluster. The list of frequently occurring words (W) may be calculated for each cluster, using a frequency threshold method. A list of frequently occurring locations (L) may be calculated for each cluster based on a frequency threshold. In this frequency measurement, two locations are similar, if the intersection area covers more than 90% of the union area. As would be understood, W and L may be calculated separately.

Using the W and L, the number of times that each of the words or locations (or both) occur in a cluster of samples is counted by generating a frequency matrix F. To consider cases where non-frequent words or locations happen an element ϕ is added to W and L. The frequency matrix has an extra row and column ($F_{|W|+1, |L|+1}$). In this representation, $F_{i,j}$ shows the number of times the $i_{th}$ word in W has occurred at the $j_{th}$ location in L is generated by going over screenshots of a cluster. Moreover, $F_{(|W|, j)}$ indicates the number of times non-frequent words happened in the $j_{th}$ frequent location. The non-frequent words may occur in the $j_{th}$ frequent location when various data appears in the same location for data entry locations on screenshots.

To build a template, the set of words and locations that occur frequently (with frequency larger than 70% of the maximum observed frequency in each column, excluding the last row and column) is selected. For the last row and column, the 70% threshold of their maximum value if used respectively. As would be understood other thresholds may also be used, including 60%, 80% and thresholds found incrementally between 60-80%, for example. Any threshold between 0 and 100% may conceivably be used, although only threshold above 50% or so are most useful in the present application.

Figure 3:
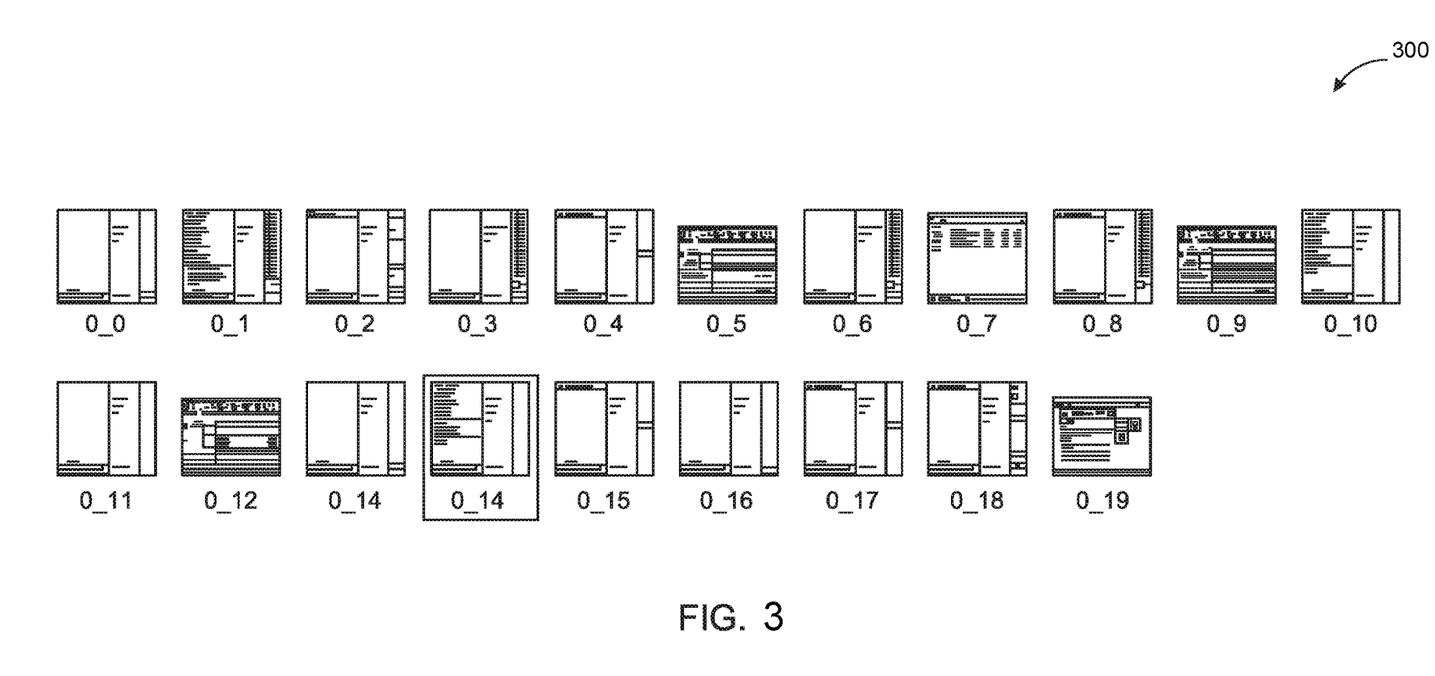
FIG. 3 illustrates a set of screenshots that are clustered to define templates.

A template includes combinations of words and locations, illustrating the static parts of the page, as well as locations with various data which are the placeholders and frequent words that occur in various locations. FIG. 3 illustrates a set of screenshots 300 that are clustered to define templates.

Adaptive parameter tuning may be employed during an iteration for clustering actions 210. The templates described above may be used to evaluate the clustered samples and tune the clustering parameters for future iteration. To evaluate a cluster based on the template $t_k$ corresponding to $k_{th}$ cluster $c_k$, the percentage of template elements to non-template elements in the cluster is measured based on Equation 3:

$$\text{score}(tk) = \frac{|\text{sum}(F) - F_{|W|,|L|}^{t_k}|}{F_{|W|,|L|}^{t_k}}. \quad \text{Equation 3}$$

In this score, $F_{|W|,|L|}^{t_k}$ is the number of nonfrequent words and locations. This score gives an estimate of how much of the screenshot contents are similar to those in the current cluster.

The screenshots of different applications result in different template scores in the ideal clustering. This means that screenshots vary in the required clustering granularity. Therefore, the variance scores of the templates var(score($t_k$)) for k ∈ (0,K)) is used to trigger a change in the number of clusters which may be increased or decreased based on the average of template scores.

Random sampling may be used in the clustering actions 210 to ensure robust clusters and for scalability proposes. A resampling method similar to that of traditional particle swarm optimization is used. That is, the clustering is done over a small random sample of the data set and in each iteration a weighted resampling may choose R % of the previous samples and (1−R) % is randomly sampled from the main dataset. To encourage diverse samples, each time a sample is drawn from the data set, its weight may be reduced in half, or by some other amount in order to lessen repetitive samples and increase diversity of samples.

In each iteration of clustering actions 210, the templates are extracted for each cluster. Each sample is then represented as a binary feature vector, indicating the presence of any of the template items. Afterwards, the mini batch k-means method is used to cluster the using the feature vectors. At the end of the iterations, or a given iteration, the final template set is used to generate sparse representation of the screenshots for clustering.

This clustering actions 210 is executed over screenshots of each application separately and data is clustered based on various granularities for each application. The sequence extraction 220 may be dependent on proper clustering of semantic actions 210. This particle-based clustering approach learns sparse representation of screens and tunes clustering granularity as needed, such as by processing a small subset of the whole dataset to generate OCR-based features.

After unification of samples into cluster labels resulting from clustering actions 210, sequence extraction 220 may be performed. Initially, the data set is cleaned by discarding consequent events on the same screen. The discarding aids in focusing on screen-level sequence extraction 220. The discarded data may be used in subsequent detail sequence extraction 220.

To extract sequences 220, the relationship between each consequent event may be evaluated by utilizing a forward link prediction module. The forward link prediction module may consider each event individually and foreshadow ahead in time to determine which future events are linked to the considered event. In so doing, each event may be represented as its screenshot, the OCR words and locations gathered in action clustering 210 and the screenshot cluster label. The forward link prediction module applies the link prediction method to each of the events corresponding to a screenshot s. To do so, a list of the events happening in the next t seconds are gathered as E(s) as defined in Equation 4:

$$E(s)=\{s', \text{time}(s')-\text{time}(s)<t\} \quad \text{Equation 4.}$$

To estimate whether any of the events in E(s) are linked to e, Equation 5 is used:

$$p(s,s') = \frac{g(\tau)}{\Pi_{w \in s,s'} p(w|\pi(s))p(w|\pi(s))}, \quad \text{Equation 5}$$

where g(T) is a Gaussian function with zero mean and T=time(s')−time(s). The denominator in the equation is based on co-occurrence of words that are not frequent parts of the corresponding screens which may be an indication of two screens being linked. Using Equation 5 provides the probabilities as measured with a normalized frequency over samples of a cluster.

Figure 4:
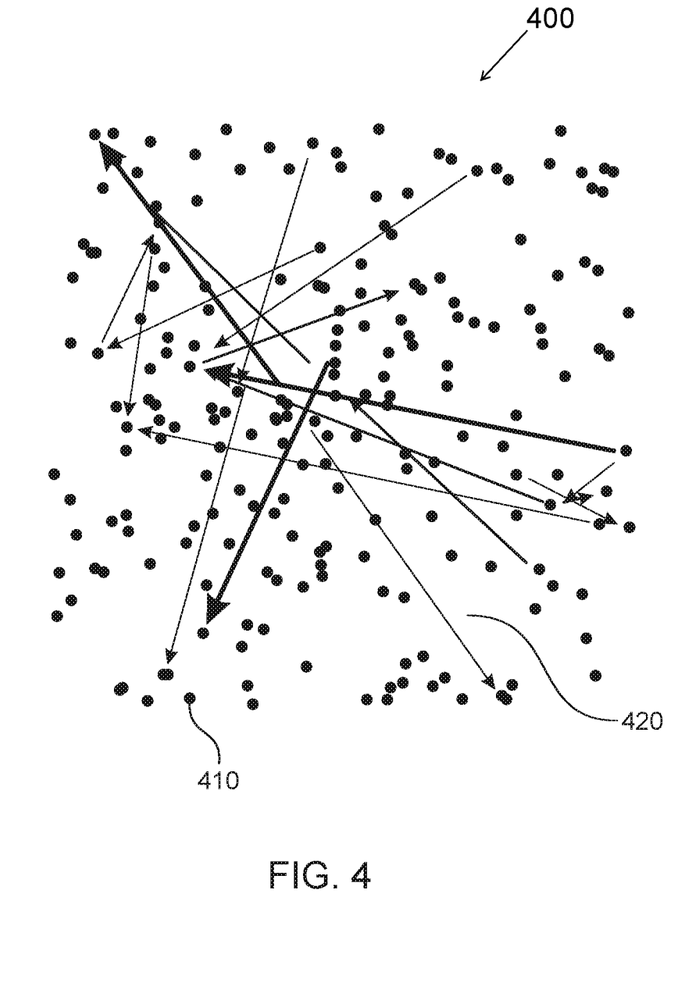
FIG. 4 illustrates a graph of the flow of the action sequences on a screen level.

A graph of action sequences may be generated. The resulting graph 400 illustrated in FIG. 4 illustrates the flow of the action sequences on screen level. Graph 400 may be used for interpretation of the repetitive tasks that user performs, by keeping track of the samples that contributed to the weight of edges. In the graph, each node 410 corresponds to a screen type discovered in action clustering 210. The edges 420 of the graph are directed from each event to its linked events identified in the action clustering. Each edge 420 is weighed as the corresponding p(s, s') values.

Figure 5:
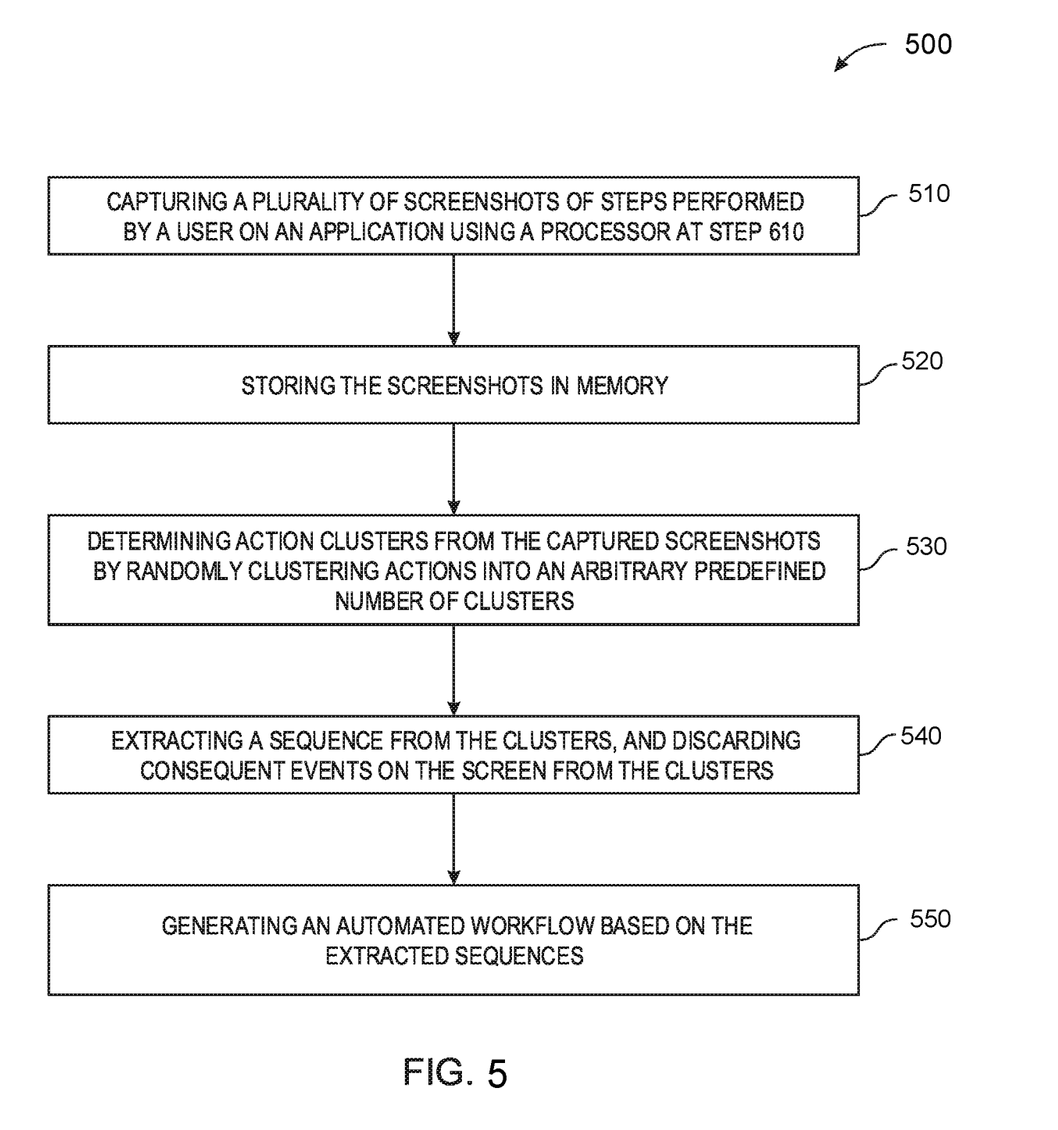
FIG. 5 illustrates a method for sequence extraction using screenshot images to generate a robotic process automation workflow.

FIG. 5 illustrates a method 500 for sequence extraction using screenshot images to generate a robotic process automation workflow. Method 500 includes capturing a plurality of screenshots of steps performed by a user on an application using a processor at step 510. At step 520, method 500 includes storing the screenshots in memory. At step 530, method 500 includes determining action clusters from the captured screenshots by randomly clustering actions into an arbitrary predefined number of clusters. The screenshots of different variations of a same action may be labeled in the clusters. At step 540, method 500 includes extracting a sequence from the clusters, and discarding consequent events on the screen from the clusters. At step 550, method 500 includes generating an automated workflow based on the extracted sequences.

The present embodiments save time by automatically identifying user task that is repetitively done, retains control over what is shared and provides increased efficiency.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A method for sequence extraction using screenshot images to generate a robotic process automation workflow, the method comprising:
    capturing a plurality of screenshots of steps performed by a user on an application using a processor, wherein the capturing includes templating to find a plurality of words and a corresponding location for each of the plurality of words to cluster in forming a template;
    storing the screenshots in memory;
    determining action clusters from the captured screenshots by randomly clustering actions into an arbitrary predefined number of clusters based on a template applied to the captured screenshots, wherein screenshots of different variations of a same action is labeled in the clusters;
    extracting a sequence from the clusters, and discarding consequent events on the screen from the clusters; and
    generating an automated workflow based on the extracted sequences.

2. The method of claim 1, wherein the templating utilizes a threshold in indicating the plurality of words.

3. The method of claim 2, wherein the threshold comprises approximately 70%.

4. The method of claim 1, wherein the capturing includes adaptive parameter tuning to iterate a template and tune the capturing for subsequent iterations.

5. The method of claim 1, wherein the capturing includes random sampling utilizing particle swarm optimization.

6. The method of claim 1, wherein the capturing includes clustering details incorporating a binary feature vector indicating a presence of template items.

7. The method of claim 1, wherein the capturing includes novelty by learning sparse representation of screens and tuning cluster granularity.

8. The method of claim 1, wherein the extracting includes forward link estimation utilizing a forward link prediction module to consider each event and link future events with each event.

9. The method of claim 1, wherein the extracting includes graphical representation with each graph node corresponding to a screen type discovered in the clustering.

10. The method of claim 9, wherein the edges of the graph represent each event and the events linked events.

11. The method of claim 1, wherein the clustering leverages optical character recognition (OCR) data to extract word and location pairs.

12. A system for sequence extraction using screenshot images to generate a robotic process automation workflow, the system comprising:
    a processor configured to capture a plurality of screenshots of steps performed by a user on an application, wherein the capturing includes templating to find a plurality of words and a corresponding location for each of the plurality of words to cluster in forming a template; and a memory module operatively coupled to the processor and configured to store the screenshots; the processor further configured to:

determine action clusters from the captured screenshots by randomly clustering actions into an arbitrary predefined number of clusters based on a template applied to the captured screenshots, wherein screenshots of different variations of a same action is labeled in the clusters;

extract a sequence from the clusters, and discarding consequent events on the screen from the clusters; and generate an automated workflow based on the extracted sequences.

13. The system of claim 12, wherein the capturing includes adaptive parameter tuning to iterate a template and tune the capturing for subsequent iterations.

14. The system of claim 12, wherein the capturing includes clustering details incorporating a binary feature vector indicating a presence of template items.

15. The system of claim 12, wherein the capturing includes novelty by learning sparse representation of screens and tuning cluster granularity.

16. The system of claim 12, wherein the extracting includes forward link estimation utilizing a forward link prediction module to consider each event and link future events with each event.

17. The system of claim 12, wherein the extracting includes graphical representation with each graph node corresponding to a screen type discovered in the clustering.

18. A non-transitory computer-readable medium comprising a computer program product recorded thereon and capable of being run by a processor, including program code instructions for sequence extraction using screenshot images to generate a robotic process automation workflow by implementing the steps comprising:

capturing a plurality of screenshots of steps performed by a user on an application using a processor, wherein the capturing includes templating to find a plurality of words and a corresponding location for each of the plurality of words to cluster in forming a template;

storing the screenshots in memory;

determining action clusters from the captured screenshots by randomly clustering actions into an arbitrary predefined number of clusters based on a template applied to the captured screenshots, wherein screenshots of different variations of a same action is labeled in the clusters;

extracting a sequence from the clusters, and discarding consequent events on the screen from the clusters; and generating an automated workflow based on the extracted sequences.

* * * * *